(12) United States Patent
Janke

(10) Patent No.: US 6,789,585 B1
(45) Date of Patent: Sep. 14, 2004

(54) REFRIGERATOR AND AUTOMATED LIQUID DISPENSER THEREFOR

(75) Inventor: Donald E. Janke, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/615,975

(22) Filed: Jul. 9, 2003

(51) Int. Cl.$^7$ .............................................. B65B 1/04
(52) U.S. Cl. ...................... 141/198; 141/95; 141/351; 250/222.1; 250/900
(58) Field of Search .................... 141/95, 198, 351; 250/222.1, 224, 900–904; 222/56

(56) References Cited

U.S. PATENT DOCUMENTS

| | | | |
|---|---|---|---|
| 3,823,846 A | * | 7/1974 | Probst ........................ 222/641 |
| 4,202,387 A | * | 5/1980 | Upton ........................ 141/360 |
| 4,807,086 A | | 2/1989 | Chambliss .................. 361/212 |
| 5,491,333 A | * | 2/1996 | Skell et al. ............... 250/222.1 |
| 5,551,598 A | | 9/1996 | Cutsinger .................... 222/52 |
| 6,425,425 B2 | | 7/2002 | Bianchi ...................... 141/362 |

* cited by examiner

*Primary Examiner*—Steven O. Douglas
(74) *Attorney, Agent, or Firm*—Stephen Krefman; Robert O. Rice; John F. Colligan

(57) ABSTRACT

The invention relates to an automated liquid dispenser employing ultrasonic sensing to determine the level of a dispensed liquid with respect to the height of a container to be filled. In one aspect, the invention relates to a refrigerator with an automated liquid dispenser that utilizes ultrasonic sensing.

34 Claims, 4 Drawing Sheets

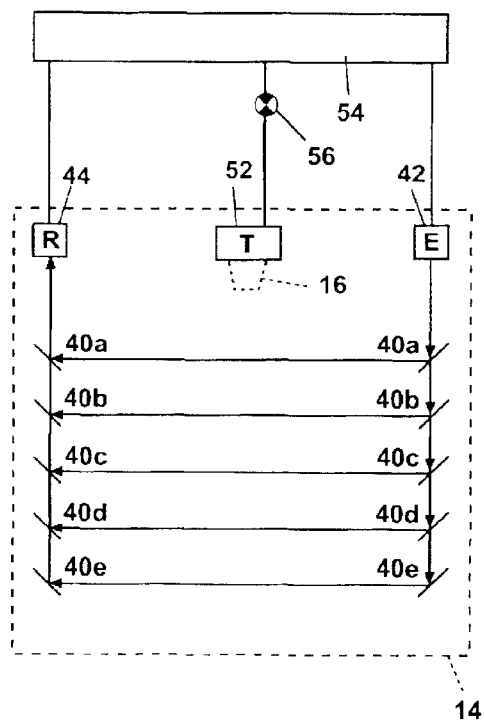
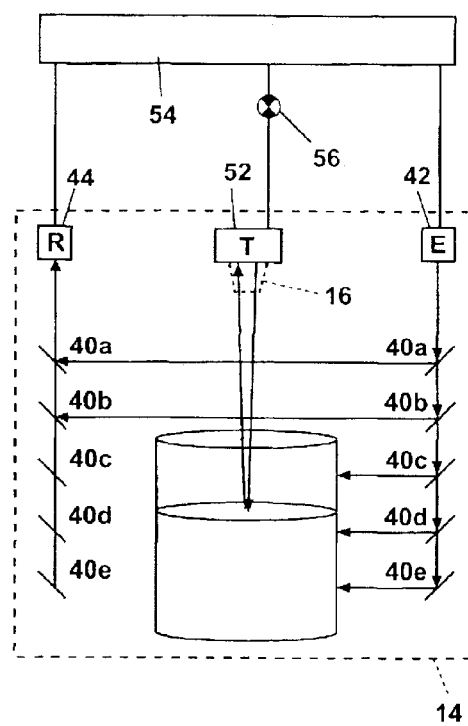
Fig. 4A    Fig. 4B
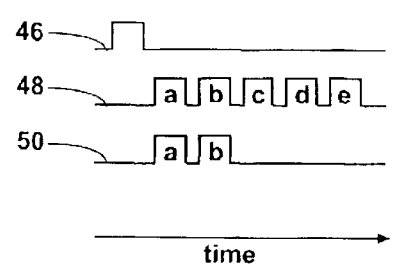
Fig. 5

REFRIGERATOR AND AUTOMATED LIQUID DISPENSER THEREFOR

BACKGROUND OF THE INVENTION

1. Field of the Invention

In one aspect, the invention relates to automated liquid dispensers and more particularly to automated liquid dispensers that sense the level of a dispensed liquid with respect to the height of a container to be filled to prevent overfilling. In another aspect, the invention relates to a refrigerator incorporating an automated liquid dispenser.

2. Description of the Related Art

Contemporary refrigerators commonly have a water/beverage dispenser located in the door of the refrigerator for the external dispensing of liquid, usually chilled water, from the refrigerator. An ice dispenser often accompanies the liquid dispenser. Illustrative dispensers are shown in U.S. Pat. Nos. 6,425,425; 5,551,598; and 4,807,086, which are incorporated by reference.

Some dispensers are activated via a pressure-sensitive switch that is depressed by a container, such as a cup or glass, when it is inserted into the dispenser. Others employ buttons that a user continuously pushes until the desired amount of water has been dispensed. Both of these systems require a user to remain at the refrigerator to either hold the container in place or to push the buttons during dispensing. Additionally, dispensing can be undesirably interrupted and take longer than necessary if the user is unable to continuously activate the dispenser.

A known problem of such dispensers is that inattentive users can overfill the container, resulting in the spilling of the liquid onto the refrigerator or surrounding floor. It is desirable to provide the dispenser with overfill protection that stops the dispensing of the liquid regardless of the user input.

Overfill protection systems are known and many work fairly well for their intended purpose. Most of the known overfill protection systems rely on a plurality sensors to sense the container height and the liquid level. The use of a plurality of sensors increases the cost of the system. In a commodity market like household refrigerators, the additional cost attributable to the plurality of sensors is highly undesirable. There is a continuous need in this market for properly functioning systems with reduced cost.

SUMMARY OF THE INVENTION

In one aspect, the invention relates to an automated liquid dispenser for dispensing a liquid into an open-top container comprising a housing defining a dispensing zone for receiving the open-top of the container, a liquid dispensing spout extending from the housing and above the dispensing zone for dispensing liquid into the container, and first and second reflector arrays disposed on opposite sides of the dispensing zone such that the open-top container is between the first and second arrays when the open-top container is received within the dispensing zone. Each reflector array comprises multiple vertically spaced reflectors, with a reflector on the first array being paired with a reflector on the second array. An emitter is mounted in a position to emit a signal onto the multiple reflectors of the first reflector array for reflection across the dispensing zone and onto the corresponding paired reflectors of the second array, and a receiver is mounted in a position to receive the emitted signal reflected from the reflectors of the second array and generate a container height signal. Additionally, the dispenser comprises a liquid level sensor for determining the liquid level in the container and generating a liquid level signal and a controller coupled to the receiver and the liquid level sensor for controlling the filling of the liquid into the container based on the received container height signal and the liquid level signal.

The first and second reflector arrays can be removably mounted to the housing. Further, the first reflector array can be carried by a first panel and the second reflector array can be carried by a second panel, wherein the first and second panels are removably coupled to the housing. The reflectors can be integrally formed with the panels and are preferably molded from a thermal plastic material.

The reflectors are disposed at a predetermined angle relative to a plane orthogonal to the emitted signal such that the emitted signal is reflected from the reflectors of the first array horizontally across the dispensing zone, onto the paired reflectors of the second array, and then onto the receiver. The predetermined angle for the reflectors of the first array is preferably 45-degrees relative to a plane orthogonal to the emitted signal, and the predetermined angle for the reflectors of the second array is preferably –45 degrees relative to a plane orthogonal to the emitted signal.

The reflectors in each array are arranged in a step configuration with a vertical offset and a lateral offset between adjacent reflectors, wherein the vertical offset can be between 0.75 and 2 inches and the lateral offset can be 0.25 to 1.00 inches.

The liquid level sensor is a wide bandwidth transducer, such as a piezo film or a micro-electro-mechanical system (MEMS).

The container height signal is composite signal of all the signals reflected across the dispensing zone and not blocked by the open-top container.

In another aspect, the invention relates to a refrigerator in combination with a liquid dispenser for dispensing a liquid into an open-top container, wherein the refrigerator comprises a cabinet having at least one refrigerated compartment with an open face and a door movably mounted to the refrigerated compartment for movement between a closed position, where the door covers the open face, and an open position, where the door is withdrawn from the open face. The liquid dispenser in combination with the refrigerator comprises a housing located in a recess in the door and defining a dispensing zone for receiving the open-top of the container. A liquid dispensing spout extends from the housing and above the dispensing zone for dispensing liquid into the container. First and second reflector arrays are disposed on opposite sides of the dispensing zone such that the open-top container is between the first and second arrays when the open-top container is received within the dispensing zone, and each reflector array comprises multiple vertically-spaced reflectors, with a reflector on the first array being paired with a reflector on the second array. An emitter is mounted in a position to emit a signal onto the multiple reflectors of the first reflector array for reflection across the dispensing zone and onto the corresponding paired reflectors of the second array, and a receiver is mounted in a position to receive the emitted signal reflected from the reflectors of the second array and generate a container height signal. Additionally, the dispenser comprises a liquid level sensor for determining the liquid level in the container and generating a liquid level signal and a controller coupled to the receiver and the liquid level sensor for controlling the filling of the liquid into the container based on the received container height signal and the liquid level signal.

The first and second reflector arrays can be removably mounted to the housing. Furthermore, the first reflector array can be carried by a first panel and the second reflector array can be carried by a second panel, wherein the first and second panels are removably coupled to the housing. The housing comprises opposing sides, with each side having a channel, and the panels are received within the channels to mount the panels to the housing. The reflectors can be integrally formed with the panels and are preferably molded from a thermal plastic material.

The housing further comprises an upper wall spanning the side walls, and the emitter, receiver, and liquid level sensor are mounted to the upper wall. The dispensing spout extends through the upper wall.

The reflectors are disposed at a predetermined angle relative to a plane orthogonal to the emitted signal such that the emitted signal is reflected from the reflectors of the first array horizontally across the dispensing zone, onto the paired reflectors of the second array, and then onto the receiver. The predetermined angle for the reflectors of the first array is preferably 45 degrees relative to a plane orthogonal to the emitted signal, and the predetermined angle for the reflectors of the second array is preferably −45 degrees relative to a plane orthogonal to the emitted signal.

The reflectors in each array are arranged in a step configuration with a vertical offset and a lateral offset between adjacent reflectors. The vertical offset can be between 0.75 and 2 inches, and the lateral offset can be 0.25 to 1.00 inches.

The liquid level sensor is a wide bandwidth transducer, such as a piezo film or a micro-electro-mechanical system (MEMS).

The container height signal is composite signal of all the signals reflected across the dispensing zone and not blocked by the open-top container.

BRIEF DESCRIPTION OF THE DRAWINGS

In the drawings:

FIG. 4a is a schematic view of the automatic liquid dispenser of FIG. 1 illustrating a controller and sensors for determining the container top and the liquid level, including an emitter and receiver and the transit path of the signals sent from the emitter, reflected by reflectors, and received by a receiver.

FIG. 4b is a schematic view identical to FIG. 4b, except with a container partially filled with liquid disposed between the first and second reflector arrays and showing emission and reflection paths of signals emitted from the emitter for determining the position of the top of the container and from a transducer for determining the liquid level.

FIG. 5 is a schematic view of a signal from the emitter, the signal as received by a receiver when no container is disposed in the housing, and the signal as received by the receiver when the container in FIG. 4b is disposed in the housing.

DESCRIPTION OF THE INVENTION

Figure 1:
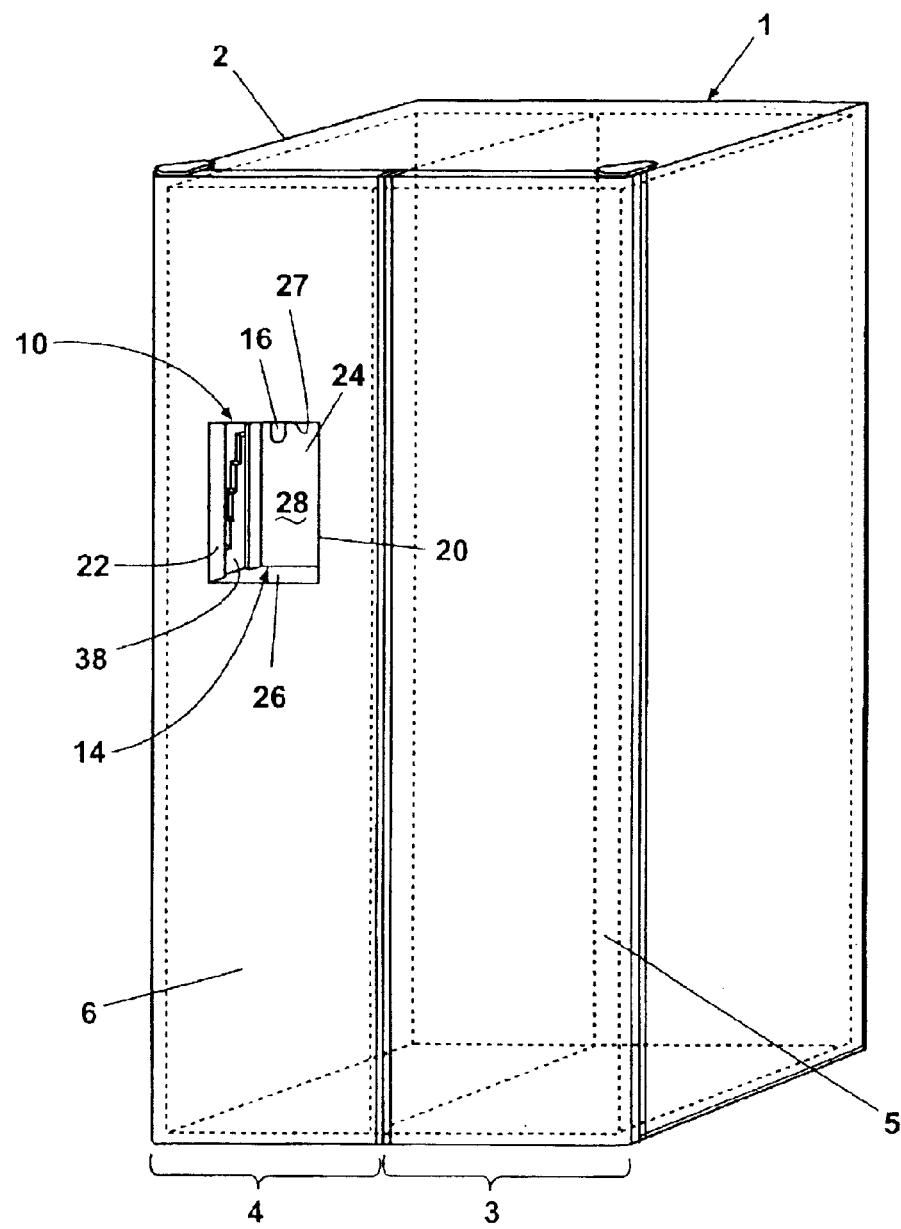
FIG. 1 is a perspective view of a refrigerator with an in-the-door automatic liquid dispenser according to the invention comprising a housing received within a recess in the door.
Figure 2:
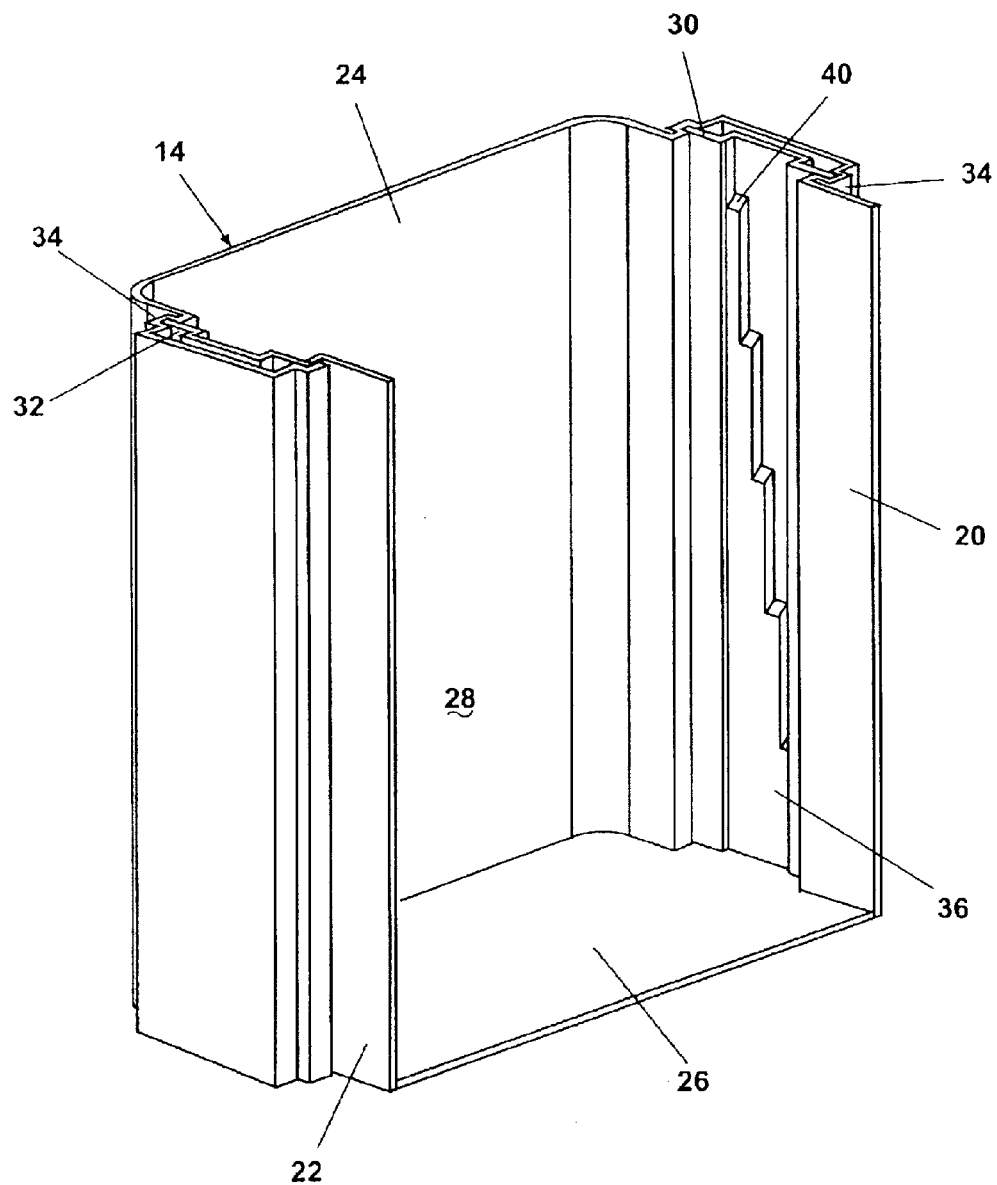
FIG. 2 is a perspective view of the housing of FIG. 1, carrying first and second panels to which are mounted first and second reflector arrays used to determine the location of the top of a container.
Figure 3:
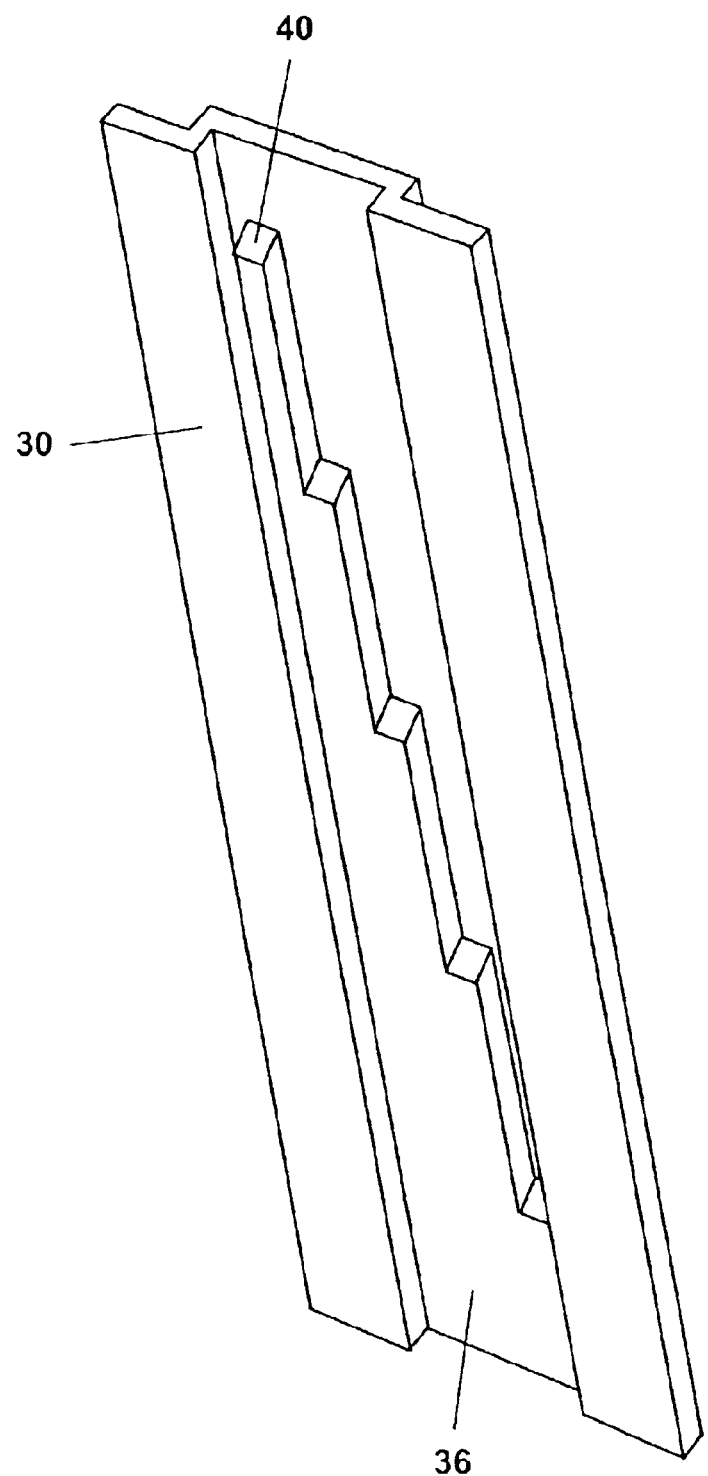
FIG. 3 is a perspective view of the first panel and the first reflector array in FIG. 2.

Referring now to the figures, and FIGS. 1–3 in particular, a refrigerator 1 is illustrated with an automatic liquid dispenser 10 in accordance with the invention. The refrigerator 1 is of conventional construction and comprises a cabinet 2 divided into a refrigerator compartment 3 and a freezer compartment 4, both of which have an open face that is selectively closed by a corresponding door 5, 6. A conventional refrigeration system is utilized to send chilled air into both compartments 3, 4.

The dispenser 10 is positioned within one of the doors 5, 6. As illustrated, the dispenser 10 is positioned within the door 6 covering the freezer compartment 4. However, the dispenser could be located in either door. The dispenser is similar in shape, size, and general appearance to conventional refrigerator door dispensers and is located within a recess formed in the door 6.

Referring to FIGS. 1 and 2, the dispenser 10 comprises a housing 14 that is positioned within the recess formed in the door 6. The housing 14 provides support or an interface for the various components forming the dispenser 10. For example, a dispensing spout 16 projects through and is guided by a top wall 27 of the housing 14. In addition to the top wall 27 (which is not shown in FIG. 2), the housing 14 has parallel first and second side walls 20, 22, a rear wall 24 connecting the rear edges of the side walls 20, 22, and a bottom wall 26 connecting the bottom edges of the side walls 20, 22. The side walls 20, 22 each have a vertical channel 34 that generally extends from the top wall 27 to the bottom wall 26. The housing 14 defines an open-faced recess 28 for receiving therein at least a portion of a container to be filled, and the open face of the recess 28 is substantially coincident with the outer surface of the refrigerator door 6 when the dispenser 10 is located in the refrigerator 1. If the container is completely disposed inside the recess 28, the container can set upon the bottom wall 26 of the housing.

The recess 28 defines a dispensing zone in which an open-top container can be received for filling from the dispensing spout 16. As illustrated, the dispensing spout 16 is preferably positioned above and centered relative to the width of the dispensing zone such that the dispensing spout 16 is generally aligned with the center of a container that is properly placed within the dispensing zone. A valve 56, for example a solenoid valve, shown schematically in FIGS. 4a and 4b, controls, i.e. turns on and off, the dispensing of liquid through the spout 16. Dispensing spouts and valves are well known in the field and are not germane to this invention.

The dispensing zone need not be coincident with the recess 28. It is within the scope of the invention for the dispensing zone to be formed by a portion of the recess 28. This is especially true when the dispenser 10 includes an ice cube dispenser, which dispenses into the recess.

The dispenser 10 further comprises first and second reflector arrays 36, 38 removably mounted to the first and second side walls 20, 22, respectively, on opposite sides of the dispensing zone. The arrays 36, 38 have a vertical stair-step structure with an individual reflector 40a–40e located at each step, wherein the reflectors 40a–40e are vertically and laterally offset relative to each other so that at least a portion of a reflector extends vertically below and horizontally beyond the reflector disposed thereabove. The vertical and lateral offsets are defined as the distances between the horizontal centerlines and vertical centerlines, respectively, of the reflectors 40. The vertical offset between each reflector 40 is preferably constant and between 0.75 and 2 inches, depending on the desired container height resolution. A smaller distance between the reflectors 40 corresponds to a finer resolution. Although each array 36, 38 can have any suitable number of reflectors 40, each array 36, 38 preferably comprises five reflectors 40; therefore, the total height of the array 36, 38 measured from the lowest reflector to the highest reflector, can range from 3 to 8 inches. The lateral offset between each reflector is also preferably constant and can range between 0.25 and 1.00 inches. The reflectors 40 are preferably composed of a thermal plastic.

The reflectors 40a–40e of the arrays 36, 38 are arranged in corresponding pairs. That is, reflector 40a of the array 36 corresponds with reflector 40a of array 38. Each reflector 40 is oriented at an angle, preferably either a −45-degree angle or a 45-degree angle, relative to the side walls 20, 22 so that the reflectors 40 in the first array 36 are facing those of the second array 38 and the reflectors of the second array 38 are facing those of the first array 36.

As shown in FIG. 2 and 3, the arrays 36, 38 are carried by first and second plates 30, 32. Optionally, the arrays 36, 38 can be integral with the first and second plates 30, 32. The arrays 36, 38 are oriented in a plane parallel to the plane of the plates 30, 32 and parallel to the plane of the side walls 20, 22; however, the arrays 36, 38 are not limited to the parallel arrangement and can be mounted perpendicular or at an angle between parallel and perpendicular to the side walls 20, 22. The plates 30, 32 are removably coupled to the side walls 20, 22 via the channels 34. In this configuration, the plates 30, 32 are inserted into their respective channels 34 at the upper end of the housing 14 and slid into place. The plates 30, 32 can also be retained by other means, such as a snap fit, a press fit, fasteners, or clamps. Rather than being carried by plates, the arrays 36, 38 can alternatively be integral to the housing 14.

Referring now to FIG. 4a, the automatic liquid dispenser 10 further comprises an ultrasonic emitter 42 and an ultrasonic receiver 44 disposed above first and second reflector arrays 36, 38, respectively, and preferably in the line of sight of each reflector 40 on the respective arrays 36, 38. When the emitter 42 emits a signal, all reflectors 40 in the first array 36 receive the signal because of the lateral offset and, in turn, reflect the signal. Because the first reflector 40a is nearest the emitter 42, it receives and reflects the signal first. Similarly, the farthest reflector 40e receives and reflects the signal last. Given that the reflectors 40 are oriented at a 45-degree angle relative to the side walls 20, 22 and relative to a plane orthogonal to the signal, the emitted signal is reflected across the dispensing zone towards the reflectors 40 of the second array 38. The signal reflected from reflector 40a of the first array 36 is the earliest to be received and reflected by the second array 38, in particular by reflector 40a of the second array 38. Likewise, the signal reflected from reflector 40e of the first array 36 is the last to be received and reflected by the second array 38, in particular by reflector 40e of the second array 38. The receiver 44 receives the signal reflected by the second array 38 in a series of pulses because the length of the signal transit path and, therefore, the transit time increase as the distance between the reflectors 40 and the emitter 42/receiver 44 increases. As shown in FIG. 5, the emitted signal 46 is a single pulse while the received signal 48 is a composite of a series of pulses, each of which corresponds to reflection from one of the sets of reflectors 40. The number of pulses, in turn, corresponds to a vertical location in the housing 14.

It is possible that a signal reflected from one reflector 40 in the first reflector array 36 might diverge and contact more than one reflector 40 in the second reflector array 38. Preferably, the arrays 36, 38 are designed to avoid this situation; however, if it is not possible to design around diverging signals, the position of the top of the container within the housing 14 can be determined from the length of the received signal and not the number of pulses in the received signal.

To monitor the liquid level in the container, the dispenser 10 comprises a liquid level sensor, such as an ultrasonic transducer 52, positioned above the opening of the container and near the spout 16. The transducer 52 emits a signal towards the interior of the container, and the signal reflects off the surface of the liquid if there is liquid inside the container or either the bottom wall 26 of the housing 14 or the bottom of the container if no liquid is present in the container. Preferably, the dispenser utilizes a single transducer 52 that reconfigures into a receiver after a signal is emitted, but the transducer can also be an emitter/receiver pair. After the signal is reflected, it is received by the transducer 52.

Because the transducer 52 is positioned close to the reflecting surface and has to quickly reconfigure from/to a receiver, it is preferably a wide bandwidth transducer, also knows as a "low Q" transducer, such as a piezo film or a micro-electro-mechanical (MEMS) device. Vibrations in wide bandwidth transducers dampen rapidly after signal emission; thus, the transducers are able to quickly reconfigure and receive the reflected signal.

The automatic liquid dispenser 10 further comprises a controller 54 that is in communication with the emitter 42, the receiver 44, the transducer 52, and the valve 56. The controller 54 instructs the emitter 42 when to emit a signal, receives signals from the receiver 44, and receives signals from the transducer 52. The controller 54 analyzes the received signals to calculate the relative positions of the top of the container and the level of liquid within the container.

In operation, the controller 54 instructs the emitter 42 to periodically emit a pulse signal like the signal 46 in FIG. 5. If there is no obstruction to the signal path, as in FIG. 4a, the receiver 44 receives a signal having as many pulses as there are reflector pairs. For example, the signal 48 in FIG. 5 has five pulses that correspond to the five reflector pairs in FIG. 4a. The receiver 44 converts the received signal to an output signal having an appropriate format, such as digital or analog, and sends the output signal to the controller 54. The controller 54 analyzes the signal and determines that there is no container in the dispensing zone.

When a user inserts at least the open top of a container into the dispensing zone, the container obstructs the path between the first and second reflector arrays 36, 38 such that signals reflected by the reflectors 40 on the first array 36 below the top of the container do not reach the second reflector array 38 and are not received by the receiver 44. For example, when the container in FIG. 4b is inserted into the dispenser 10, the container impedes signals reflected from reflectors 40c, 40d, and 40e of the first array 36 and prevents the signals from reaching reflectors 40c, 40d, and 40e of the second array 38. As a result, the signal received by the receiver 44 comprises a number of pulses corresponding to the number of reflector 40 pairs located above the top of the container. As depicted in FIG. 5, the signal 50 received by the receiver 44 in FIG. 4b comprises two pulses received from reflectors 40a and 40b of the second array 38. Once all of the pulses in the signal 50 are received, the receiver 44 converts the signal 50 to a container height signal and sends the container height signal to the controller 54.

After the controller 54 receives the signal, the controller 54 detects that the container height signal is different than the unobstructed signal and determines that a container is positioned in the dispensing zone. As a result, the controller 54 determines from the number of pulses in the container height signal the location of the top of the container within the housing 14, engages the transducer 52 to monitor the liquid level in the container, and optionally, turns on a dispenser light (not shown). The transducer 52 sends a signal that is initially reflected by either the bottom wall 26 of the housing 14 or the bottom wall of the container and receives and converts the signal into a liquid level signal that contains information about the location of the surface of the liquid within the dispenser.

Next, the transducer 52 communicates the container height signal to the controller 54, and the controller 54, having determined that no liquid is present in the container, begins dispensing liquid through the spout 16 by opening the valve 56. The transducer 52 sends and receives signals that are reflected by the surface of the liquid in the container. These signals are subsequently converted in to liquid level signals and communicated to the controller 54. As the container is filled, the time required for the signal to travel from and return to the transducer 52 is reduced; therefore, a shorter transit time corresponds to a higher liquid level.

The controller 54 regulates the filling of the container by comparing the container height signal to the liquid level signal, which is continuously changing, to determine when the liquid has reached a desired level relative to the position of the top of the container. For example, if the container is to be almost completely filled, the controller 54 might stop the dispensing of liquid by closing the valve 56 when the liquid level is a certain distance below the top of the container or has reached a height corresponding to a certain percentage, for example 95%, of the container height. Similarly, if the container is to be half filled, the controller 54 can stop the dispensing of liquid when the liquid level has reached a height corresponding to 50% of the container height. The controller 54 can be programmed for several dispensing levels and can have a default level. If the default level is not desired, the preferred level can be selected through user-operated controls, such as buttons or digital displays, on the dispenser 10. Once the container is filled to the desired level and the valve 56 has been closed, the user removes the filled container from the dispensing zone.

Although the dispenser 10 has thus far been described in conjunction with ultrasonic signals, it is within the scope of the invention to utilize other types of signals. It is, however, necessary that the container is not transparent to the signals and can act as a barrier to signal transmission. Furthermore, the dispenser 10 is not limited to use in a refrigerator. The dispenser can be employed in a restaurant beverage dispenser, a portable liquid storage and dispensing cooler, or any other relevant application.

The current invention provides an automated liquid dispenser that prevents overfill of a container and does not require the user to remain at the dispenser. Additionally, the reflector arrays have a simple design and comprise few parts, thus reducing the likelihood of mechanical or structural failure. In the exceptional case that the reflector arrays need to be replaced or repaired, they are easily removable from the housing. The dispenser is cost efficient because it requires only one emitter/detector pair to determine the height of the container. Furthermore, since the glass height system uses known transit path lengths, it can be utilized to calibrate the water height system if needed, for example if the speed of the ultrasonic signals changes due to temperature.

While the invention has been specifically described in connection with certain specific embodiments thereof, it is to be understood that this is by way of illustration and not of limitation, and the scope of the appended claims should be construed as broadly as the prior art will permit.

What is claimed is:

1. An automated liquid dispenser for dispensing a liquid into an open-top container, comprising:

a housing defining a dispensing zone for receiving the open-top of the container;

a liquid dispensing spout extending from the housing and above the dispensing zone for dispensing liquid into the container;

first and second reflector arrays disposed on opposite sides of the dispensing zone such that the open-top container is between the first and second arrays when the open-top container is received within the dispensing zone, and each reflector array comprising multiple vertically-spaced reflectors, with a reflector on the first array being paired with a reflector on the second array;

an emitter mounted in a position to emit a signal onto the multiple reflectors of the first reflector array for reflection across the dispensing zone and onto the corresponding paired reflectors of the second array;

a receiver mounted in a position to receive the emitted signal reflected from the reflectors of the second array and generate a container height signal;

a liquid level sensor for determining the liquid level in the container and generating a liquid level signal; and a controller coupled to the receiver and the liquid level sensor for controlling the filling of the liquid into the container based on the received container height signal and the liquid level signal.

2. The automated liquid dispenser of claim 1, wherein the first and second reflector arrays are removably mounted to the housing.

3. The automated liquid dispenser of claim 2, wherein the first reflector array is carried by a first panel and the second reflector array is carried by a second panel, wherein the first and second panels are removably coupled to the housing.

4. The automated liquid dispenser of claim 3, wherein the reflectors are integrally formed with the panels.

5. The automated liquid dispenser of claim 4, wherein the reflectors are made from a thermal plastic.

6. The automated liquid dispenser of claim 1, wherein the reflectors are disposed at a predetermined angle relative to a plane orthogonal to the emitted signal such that the emitted signal is reflected from the reflectors of the first array, across the dispensing zone, onto the paired reflectors of the second array, and then onto the receiver.

7. The automated liquid dispenser of claim 6, wherein the predetermined angle for the reflectors of the first array is 45-degrees relative to a plane orthogonal to the emitted signal.

8. The automated liquid dispenser of claim 7, wherein the predetermined angle for the reflectors of the second array is −45 degrees relative to a plane orthogonal to the emitted signal.

9. The automated liquid dispenser of claim 1, wherein the reflectors in each array are arranged in a step configuration with a vertical offset and a lateral offset between adjacent reflectors.

10. The automated liquid dispenser of claim 9, wherein the vertical offset is between 0.75 and 2 inches.

11. The automated liquid dispenser of claim 10, wherein the lateral offset is 0.25 to 1.00 inches.

12. The automated liquid dispenser of claim 1, wherein the reflectors are composed of a thermal plastic.

13. The automated liquid dispenser of claim 1, wherein the liquid level sensor is a wide bandwidth transducer.

14. The automated liquid dispenser of claim 13, wherein the liquid level sensor is a piezo film.

15. The automated liquid dispenser of claim 13, wherein the liquid level sensor is a micro-electro-mechanical system (MEMS).

16. The automated liquid dispenser of claim 1, wherein the container height signal is composite signal of all the signals reflected across the dispensing zone and not blocked by the open-top container.

17. A refrigerator in combination with a liquid dispenser for dispensing a liquid into an open-top container, the refrigerator comprising:
- a cabinet having at least one refrigerated compartment with an open face;
- a door movably mounted to the refrigerated compartment for movement between a closed position, where the door covers the open face, and an open position, where the door is withdrawn from the open face;
- the liquid dispenser comprising:
  - a housing located in a recess in the door and defining a dispensing zone for receiving the open-top of the container;
  - a liquid dispensing spout extending from the housing and above the dispensing zone for dispensing liquid into the container;
  - first and second reflector arrays disposed on opposite sides of the dispensing zone such that the open-top container is between the first and second arrays when the open-top container is received within the dispensing zone, and each reflector array comprising multiple vertically-spaced reflectors, with a reflector on the first array being paired with a reflector on the second array;
  - an emitter mounted in a position to emit a signal onto the multiple reflectors of the first reflector array for reflection across the dispensing zone and onto the corresponding paired reflectors of the second array;
  - a receiver mounted in a position to receive the emitted signal reflected from the reflectors of the second array and generate a container height signal;
  - a liquid level sensor for determining the liquid level in the container and generating a liquid level signal; and
  - a controller coupled to the receiver and the liquid level sensor for controlling the filling of the liquid into the container based on the received container height signal and the liquid level signal.

18. The combination of claim 17, wherein the first and second reflector arrays are removably mounted to the housing.

19. The combination of claim 18, wherein the first reflector array is carried by a first panel and the second reflector array is carried by a second panel, wherein the first and second panels are removably coupled to the housing.

20. The combination of claim 19, wherein the housing comprises opposing sides, with each side having a channel, and the panels are received within the channels to mount the panels to the housing.

21. The combination of claim 20, wherein the housing comprises an upper wall spanning the side walls, and the emitter, receiver, and liquid level sensor are mounted to the upper wall.

22. The combination of claim 21, wherein the dispensing spout extends through the upper wall.

23. The combination of claim 19, wherein the reflectors are integrally formed with the panels.

24. The combination of claim 1, wherein the reflectors are made from a thermal plastic.

25. The combination of claim 1, wherein the reflectors are disposed at a predetermined angle relative to a plane orthogonal to the emitted signal such that the emitted signal is reflected from the reflectors of the first array, across the dispensing zone, onto the paired reflectors of the second array, and then onto the receiver.

26. The combination of claim 25, wherein the predetermined angle for the reflectors of the first array is 45 degrees relative to a plane orthogonal to the emitted signal.

27. The combination of claim 26, wherein the predetermined angle for the reflectors of the second array is −45 degrees relative to a plane orthogonal to the emitted signal.

28. The combination of claim 17, wherein the reflectors in each array are arranged in a step configuration with a vertical offset and a lateral offset between adjacent reflectors.

29. The combination of claim 28, wherein the vertical offset is between 0.75 and 2 inches.

30. The combination of claim 29, wherein the lateral offset is 0.25 to 1.00 inches.

31. The combination of claim 17, wherein the liquid level sensor is a wide bandwidth transducer.

32. The combination of claim 31, wherein the liquid level sensor is a piezo film.

33. The combination of claim 17, wherein the liquid level sensor is a micro-electro-mechanical system (MEMS).

34. The combination of claim 17, wherein the container height signal is composite signal of all the signals reflected across the dispensing zone and not blocked by the open-top container.

* * * * *